United States Patent
Bell et al.

(10) Patent No.: US 8,864,067 B2
(45) Date of Patent: Oct. 21, 2014

(54) AUXILIARY FIRE RESISTANT MOUNT SYSTEM FOR AN AUXILIARY POWER UNIT

(75) Inventors: Melissa A. Bell, San Diego, CA (US); Michael J. Rollins, Santee, CA (US); Jason Peel, Encinitas, CA (US); Greg R. Giddings, San Marcos, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 232 days.

(21) Appl. No.: 13/484,880

(22) Filed: May 31, 2012

(65) Prior Publication Data

US 2013/0320134 A1 Dec. 5, 2013

(51) Int. Cl.
*B64D 27/00* (2006.01)
*B64D 41/00* (2006.01)

(52) U.S. Cl.
USPC ............. 244/54; 244/58; 60/796; 60/797; 248/554; 248/557

(58) Field of Classification Search
USPC .......... 244/54, 58; 60/796, 797; 248/554, 557
See application file for complete search history.

(56) References Cited

U.S. PATENT DOCUMENTS

| | | | |
|---|---|---|---|
| 4,456,830 A | 6/1984 | Cronin | |
| 4,696,618 A | 9/1987 | Fairchild et al. | |
| 4,709,665 A | 12/1987 | Ewbank et al. | |
| 4,730,520 A | 3/1988 | Nishikawa et al. | |
| 5,023,789 A | 6/1991 | Lampe et al. | |
| 5,428,952 A * | 7/1995 | Jewess | 60/796 |
| 5,555,722 A | 9/1996 | Mehr-Ayin et al. | |
| 6,122,575 A | 9/2000 | Schmidt et al. | |
| 6,578,351 B1 | 6/2003 | Modafferi | |
| 7,344,107 B2 | 3/2008 | Campbell et al. | |
| 7,419,121 B2 * | 9/2008 | Williams | 244/54 |
| 7,526,921 B2 * | 5/2009 | Williams et al. | 60/796 |
| 7,611,093 B2 | 11/2009 | Campbell et al. | |
| 7,765,784 B2 | 8/2010 | Lwasa et al. | |
| 8,042,631 B2 | 10/2011 | Grieve et al. | |
| 8,104,736 B2 | 1/2012 | Callaghan | |
| 8,622,342 B2 * | 1/2014 | Filho | 244/58 |
| 2006/0107647 A1 | 5/2006 | Labala | |
| 2008/0127774 A1 | 6/2008 | Frost | |
| 2010/0019505 A1 | 1/2010 | Frost | |
| 2012/0017722 A1 * | 1/2012 | Bell et al. | 74/606 R |
| 2012/0023967 A1 * | 2/2012 | DeDe et al. | 60/796 |
| 2012/0318913 A1 * | 12/2012 | Filho | 244/58 |
| 2013/0015291 A1 * | 1/2013 | DeDe et al. | 244/54 |
| 2013/0042713 A1 * | 2/2013 | Bell et al. | 74/467 |

FOREIGN PATENT DOCUMENTS

| | | |
|---|---|---|
| EP | 1764306 A2 | 3/2007 |
| WO | 2004074096 A1 | 9/2004 |

OTHER PUBLICATIONS

International Search Report and Written Opinion for International Application No. PCT/US2013/041505 completed Aug. 7, 2013.

* cited by examiner

*Primary Examiner* — Philip J Bonzell
(74) *Attorney, Agent, or Firm* — Carlson, Gaskey & Olds, PC

(57) ABSTRACT

An auxiliary power unit is composed of a gas turbine engine, a gearbox, and a gearbox driven generator. A mount bracket is mechanically attached to the gearbox. The bracket is for connecting to an aircraft strut system. The aircraft strut system connects to the aircraft structure. The mount bracket has an upper mechanical attachment point and a lower mechanical attachment point to the gearbox. The gearbox includes an oil reservoir, and the lower attachment point is beneath the oil level within the oil reservoir such that said lower attachment point will be cooled by oil in the oil reservoir.

16 Claims, 2 Drawing Sheets

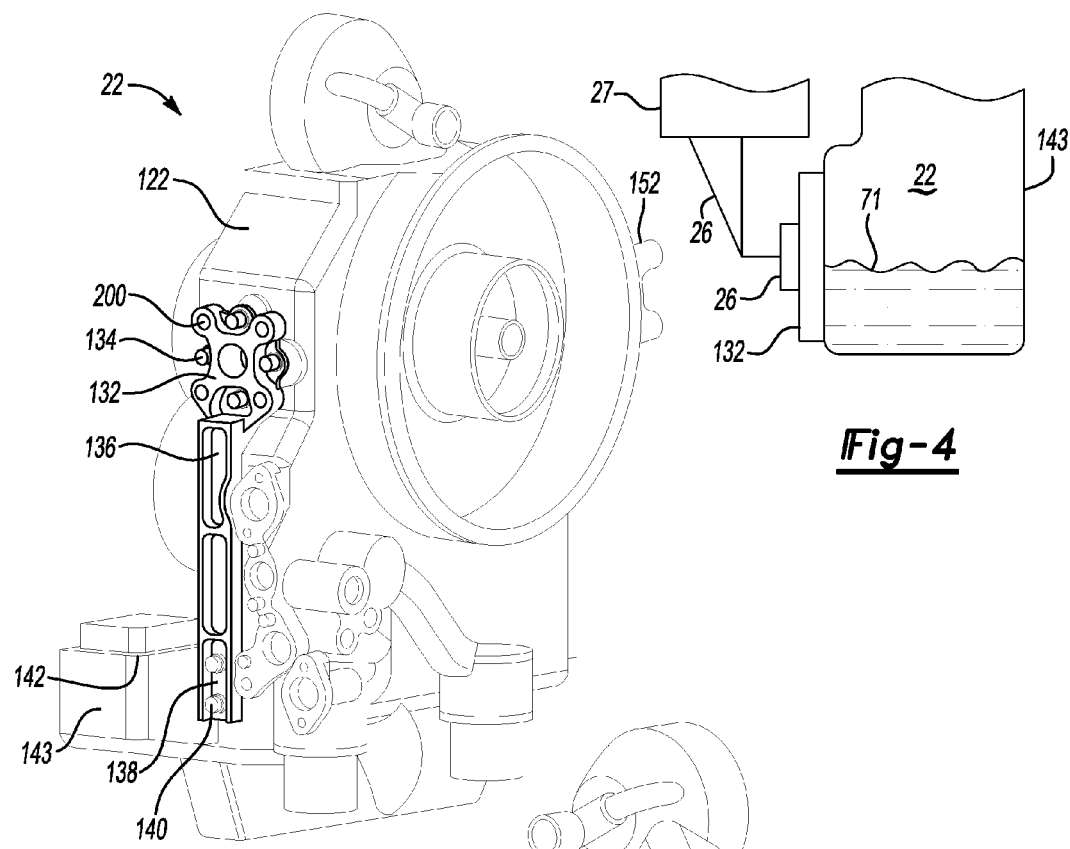
Fig-2
Fig-4
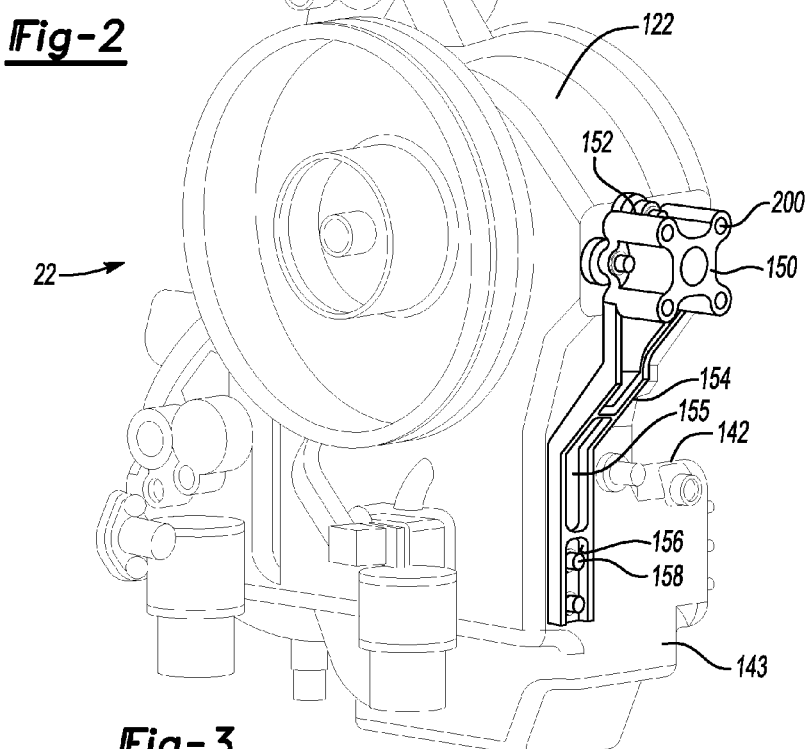
Fig-3

AUXILIARY FIRE RESISTANT MOUNT SYSTEM FOR AN AUXILIARY POWER UNIT

BACKGROUND OF THE INVENTION

This application relates to a method and apparatus for providing a fire resistant mount for mounting an auxiliary power unit ("APU") in an aircraft.

APUs are provided in aircraft, and are utilized as a source of power before the main gas turbine engines are started as well as providing power in flight in the event of an emergency situation. An APU includes a gas turbine engine that drives a gearbox which in turns drives a generator, and other required accessories. The APU is typically mounted in a compartment of an aircraft, such as the tail cone, which may be subject to any number of environmental challenges. As an example, there is potential for exposure to flame, and for simultaneous mechanical stresses imposed by aircraft loads.

The APUs have typically been mounted by a strut system which acts as the structural link between the aircraft structure and the APU. Traditionally the aircraft strut system is mechanically fastened directly to an aluminium gearbox housing for 2 of the 3 APU mount points.

Due to updated certification requirements, APU mounts are now required to be fire resistant, and in the case of a fire, APU mounting points must withstand certain loads to get the aircraft home. With the aircraft strut system attaching directly to an aluminium housing in traditional designs, it has been found that the aluminium material does not possess the properties to withstand exposure to flame for the required allotment of time, thus driving designs to implement thermal blankets as a method of protecting mount attachment points from the extreme temperatures imposed by a flame.

As various fire resistant blankets have been implemented into designs to protect the connection point between the strut system and the gearbox, these designs are not preferred for future use if they can be avoided. While the blankets ensure a fire resistant mount attachment point, they present many challenges/issues. Blanket designs are traditionally of complex geometry, costly, have a significant weight impact, are difficult to maintain, and require customer installation due the attachment methods used.

SUMMARY OF THE INVENTION

An auxiliary power unit has a gas turbine engine, a gearbox, and a gearbox driven generator. An aircraft strut system is mechanically attached to a gearbox bracket. The strut system is the method used to link the APU to the aircraft structure. The mount bracket is attached to the gearbox at two locations. The first is at an upper location on the gearbox housing, the second at a lower vertical location on the same gearbox housing. The gearbox includes an oil reservoir, and the lower attachment point of the bracket is located beneath the oil level within the oil reservoir such that said lower attachment point will be cooled by oil in the oil reservoir.

These and other features may be best understood from the following drawings and specification.

BRIEF DESCRIPTION OF THE DRAWINGS

FIG. 2 shows a first mount plate.

FIG. 3 shows a second mount plate.

FIG. 4 schematically shows how the mount plates are attached to the aircraft structure.

DETAILED DESCRIPTION

Figure 1A:
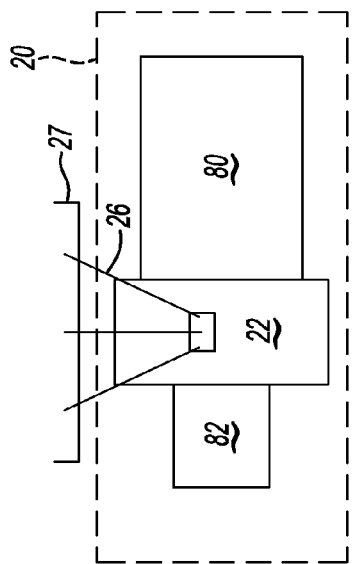
FIG. 1A schematically shows an aircraft structure including an auxiliary power unit.

FIG. 1A shows a system 20 which includes an auxiliary power unit 21 attached through an aircraft strut system 26 to an aircraft structure 27. The auxiliary power unit 21 is shown to include a gas turbine engine 80, a gearbox 22, and a gearbox driven generator 82.

Figure 1B:
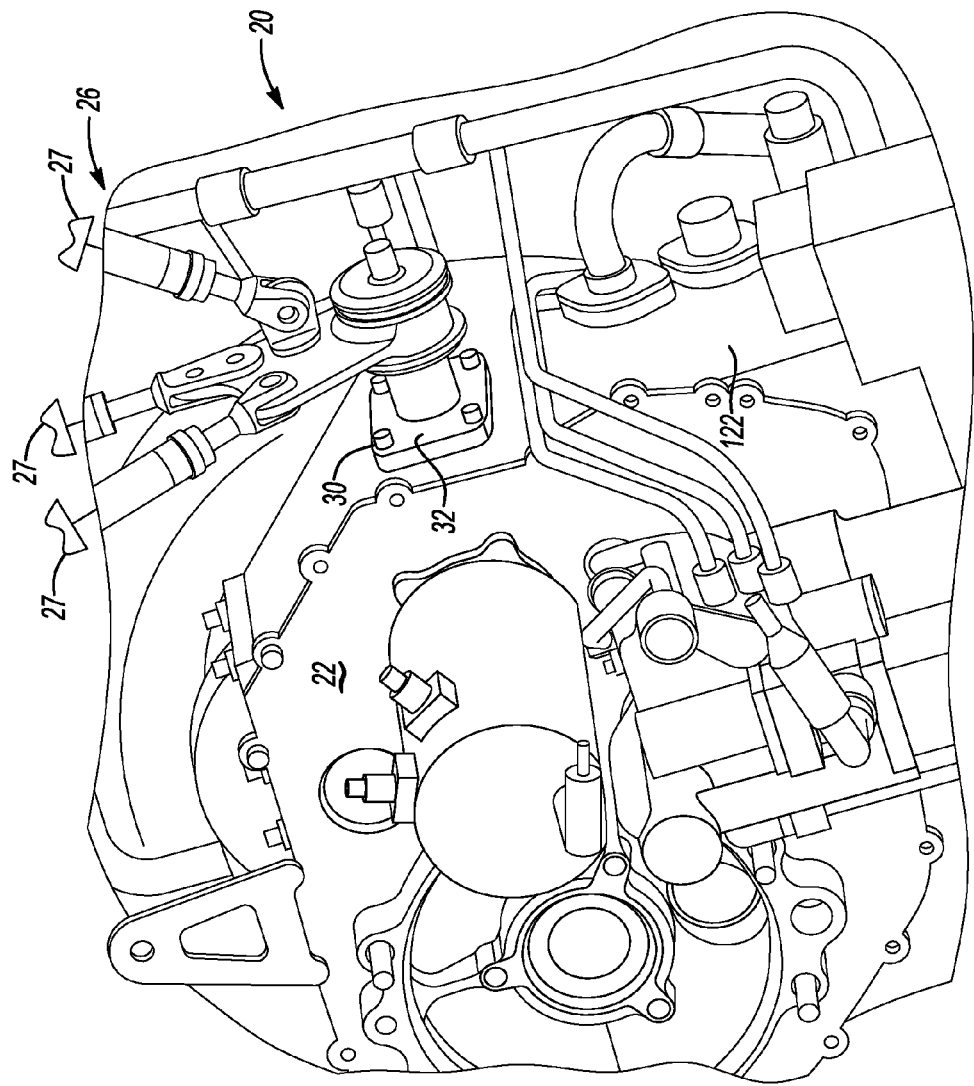
FIG. 1B shows a detail of existing auxiliary power unit mounts.

FIG. 1B shows a prior art system 20. System 20 incorporates an APU 21, shown only from the outside. It should be understood that associated with the APU 21 is the gas turbine engine 80, a gearbox 22 and an electric generator 82, along with other associated systems.

As shown, a gearbox 22 receives an aircraft strut system 26 which is bolted (30) directly to the gearbox housing 122. This attachment secures the aircraft strut system 26 to the aircraft structure 27, shown schematically. As mentioned above, there is potential for the aircraft strut system attachment point 32/30 to the gearbox housing 122 to be exposed to flame. The mount must also withstand the mechanical stresses due to aircraft loads to support the APU 21 on the aircraft structure 27.

FIG. 2 shows the gearbox 22 with a bracket 132, which attaches to the gearbox housing 122. FIG. 3 shows another bracket 150 which also attaches to the gearbox housing 122. It should be understood the mount brackets 132 and 150 of FIGS. 2 and 3 will both be connected to the aircraft strut system 26 as these are two of the three APU mount points. Both brackets 132 and 150 are attached to the gearbox housing 122 in two locations each.

Bracket 132 can be seen to be bolted 134 at a vertically upper location on the gearbox housing 122. The bracket 132 has a downwardly extending leg 136 that extends to a lower end 138. Lower end 138 also receives bolts 140. It should be understood that other mechanical attachments may replace the bolts 134 and 140. The bolt 140 can be seen to be vertically beneath a vertically upper end 142 of an oil reservoir 143. As known, when operating, there will be an expected level of oil 71 (see FIG. 4) within the reservoir 143, and it is desirable that the location of the attachment points 140 will be vertically below this oil level.

FIG. 3 shows the mount bracket 150 having bolts 152 at an upper mechanical attachment point, and inwardly extending angled portion 154 extending to a leg 155 that extends to the lower end 156. Bolts 158 are received in the lower end 156 to define the lower attachment portion. As with the FIG. 2 mount bracket, the bolts 158 are below the vertically upper end 142 of the oil reservoir 143. The bolts 158 are also below the expected oil level.

When exposed to high temperature, such as flames, the lower attachment points 140 and 158 will be cooled by oil within the oil reservoir 143. Thus, they will be able to conduct heat away more efficiently than the traditional mount attachment shown in FIG. 1B. The idea being that if the upper bracket mount point fails due to flame exposure, the lower bracket attachment point will be of much lower temperatures, and have the ability to carry the load of the APU while the aircraft travels safely home.

To this end, the lower attachment points are preferably mounted at the vertically lowermost practical location given the design of gearbox 22.

The brackets may be formed of any fire resistant material with acceptable properties given the required loads and temperatures that the brackets will be exposed to. Some examples include but are not limited to various types of steel alloys, nickel-based alloys, such as Niconel, or titanium.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. An auxiliary power unit comprising:
a mount bracket mechanically attached to a gearbox;
said mount bracket configured to be connected to a plurality of struts, said struts connected to an aircraft housing;
said mount bracket including an upper mechanical attachment point and a lower mechanical attachment point to the gearbox, said gearbox including an oil reservoir, and the lower attachment point being beneath an upper end of the oil reservoir and cooled by oil in said oil reservoir; and
a pair of said mount brackets on opposed sides of said gearbox, with each mounting bracket of said pair of mount brackets including an upper mechanical attachment point and a lower mechanical attachment point to said gearbox.

2. The auxiliary power unit as set forth in claim 1, wherein said mount bracket is connected to a mount link, said mount link configured to be connected to said struts.

3. The auxiliary power unit as set forth in claim 1, wherein said lower mechanical attachment points are vertically beneath an expected oil level in the oil reservoir.

4. The auxiliary power unit as set forth in claim 1, wherein said mount bracket has a leg extending vertically downwardly from said upper mechanical attachment point to said lower mechanical attachment point.

5. The auxiliary power unit as set forth in claim 1, wherein said mount bracket is formed of steel.

6. An auxiliary power unit comprising:
a mount bracket mechanically attached to a gearbox;
said mount bracket configured to be connected to a plurality of struts, said struts connected to an aircraft housing;
said mount bracket including an upper mechanical attachment point and a lower mechanical attachment point to the gearbox, said gearbox including an oil reservoir, and the lower attachment point being beneath an upper end of the oil reservoir and cooled by oil in said oil reservoir;
said mount bracket has a leg extending vertically downwardly from said upper mechanical attachment point to said lower mechanical attachment point; and
said leg includes an angled portion, and a straight portion.

7. The auxiliary power unit as set forth in claim 6, wherein there are a pair of mount brackets on opposed sides of said gearbox each having an upper mechanical attachment point and a low mechanical attachment point.

8. The auxiliary power unit as set forth in claim 6, wherein said lower mechanical attachment point is vertically beneath an expected oil level in the oil reservoir.

9. An aircraft including:
an aircraft housing, a plurality of struts attached to said housing;
said struts also connected to a mount bracket on an auxiliary power unit;
said mount bracket mechanically attached to a gearbox; and
said mount bracket including an upper mechanical attachment point and a lower mechanical attachment point to the gearbox, said gearbox including an oil reservoir, and the lower attachment point being beneath a vertically upper end of the oil reservoir and cooled by oil in said oil reservoir.

10. The aircraft as set forth in claim 9, wherein said mount bracket is connected to a mount link, said mount link connected to said struts.

11. The aircraft as set forth in claim 9, wherein said lower mechanical attachment point is vertically beneath an expected oil level in the oil reservoir.

12. The aircraft as set forth in claim 9, wherein said mount bracket is formed of steel.

13. The aircraft as set forth in claim 9, wherein there are a pair of mount brackets on opposed sides of said gearbox each having an upper mechanical attachment point and a lower mechanical attachment point.

14. The aircraft as set forth in claim 13, wherein said lower mechanical attachment points are vertically beneath an expected oil level in the oil reservoir.

15. The aircraft as set forth in claim 9, wherein said mount bracket has a leg extending vertically downwardly from said upper mechanical attachment point to said lower mechanical attachment point.

16. The aircraft as set forth in claim 15, wherein said leg includes an angled portion, and a straight portion.

* * * * *